US006969177B2

(12) United States Patent
Li et al.

(10) Patent No.: US 6,969,177 B2
(45) Date of Patent: Nov. 29, 2005

(54) POLARIZATION RECOVERY SYSTEM USING REDIRECTION

(75) Inventors: Kenneth K. Li, Arcadia, CA (US); Seiji Inatsugu, Santa Monica, CA (US)

(73) Assignee: Wavien, Inc., Santa Clarita, CA (US)

( * ) Notice: Subject to any disclaimer, the term of this patent is extended or adjusted under 35 U.S.C. 154(b) by 0 days.

(21) Appl. No.: 10/781,940

(22) Filed: Feb. 20, 2004

(65) Prior Publication Data

US 2004/0252478 A1    Dec. 16, 2004

Related U.S. Application Data

(63) Continuation-in-part of application No. 10/347,522, filed on Jan. 21, 2003, which is a continuation of application No. 09/814,970, filed on Mar. 23, 2001, now Pat. No. 6,587,269.

(60) Provisional application No. 60/469,393, filed on May 12, 2003, provisional application No. 60/448,471, filed on Feb. 21, 2003.

(51) Int. Cl.[7] .......................... F21V 9/14; F21V 13/08; G02B 6/27
(52) U.S. Cl. ................. 362/19; 362/293; 362/298; 362/583; 359/495; 359/496
(58) Field of Search .................. 362/19, 293, 298, 362/560, 583; 349/9; 353/20; 359/487, 494–497; 385/11

(56) References Cited

U.S. PATENT DOCUMENTS

| | | | |
|---|---|---|---|
| 4,173,412 A | 11/1979 | Ramsay et al. ............... 356/33 |
| 5,301,030 A | 4/1994 | Ko | |
| 5,303,083 A | 4/1994 | Blanchard et al. | |
| 5,513,023 A | 4/1996 | Fritz et al. | |
| 5,625,738 A | 4/1997 | Magarill ..................... 359/503 |
| 5,712,694 A | 1/1998 | Taira et al. | |
| 5,751,480 A | 5/1998 | Kitagishi .................... 359/487 |
| 5,786,873 A | 7/1998 | Chiu et al. | |
| 5,884,991 A | 3/1999 | Levis et al. | |
| 6,053,615 A | 4/2000 | Peterson et al. .............. 353/20 |
| 6,081,367 A * | 6/2000 | Yokoyama et al. ......... 359/494 |
| 6,104,454 A | 8/2000 | Hiyama et al. | |
| 6,139,157 A | 10/2000 | Okuyuma .................... 353/20 |
| 6,247,814 B1 | 6/2001 | Lin | |
| 6,288,840 B1 * | 9/2001 | Perkins et al. ............. 359/486 |
| 2003/0112511 A1 | 6/2003 | Janssen | |
| 2003/0223237 A1 | 12/2003 | Janssen | |

(Continued)

FOREIGN PATENT DOCUMENTS

CA    2290860    5/2000

(Continued)

OTHER PUBLICATIONS

Imai, Masao and Kubota, Eiichi, "Polarization Converting Element", Published Aug. 16, 1988, Japanese Patent Office Patent Journal, English translation of document JP 63197913 A, pp. 1-8.*

Primary Examiner—Alan Cariaso
(74) Attorney, Agent, or Firm—Fulbright & Jaworski LLP

(57) ABSTRACT

A polarization recovery system includes a polarizing beam splitter transmitting light of a useful polarization in an output direction and reflecting light of a non-useful polarization in a first orthogonal direction substantially orthogonal to the output direction. An initial reflector may reflect the non-useful polarization light in a second orthogonal direction substantially orthogonal to the output direction and the first orthogonal direction, and a final reflector may reflect the non-useful polarization light in the output direction. The non-useful polarization light may be rotated substantially to light of the useful polarization by the initial and final reflectors.

21 Claims, 10 Drawing Sheets

U.S. PATENT DOCUMENTS

2003/0231262 A1   12/2003   Janssen

FOREIGN PATENT DOCUMENTS

| EP | 584 802 A1 | 3/1994 |
| EP | 0 691 552 A2 | 1/1996 |
| JP | 63197913 A * | 8/1988 | .......... G02B 27/28 |
| JP | 04088301 A * | 3/1992 | .......... G02B 27/28 |
| JP | 9-326205 | 12/1997 |
| WO | WO 93/24857 A1 | 12/1993 |
| WO | WO 95/27919 A2 | 10/1995 |

* cited by examiner

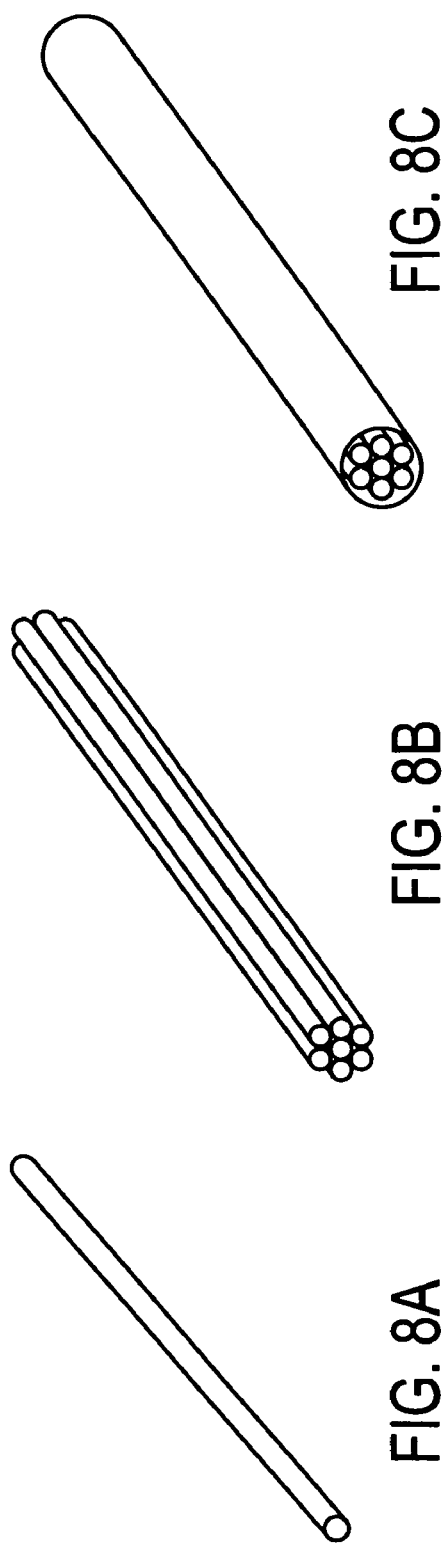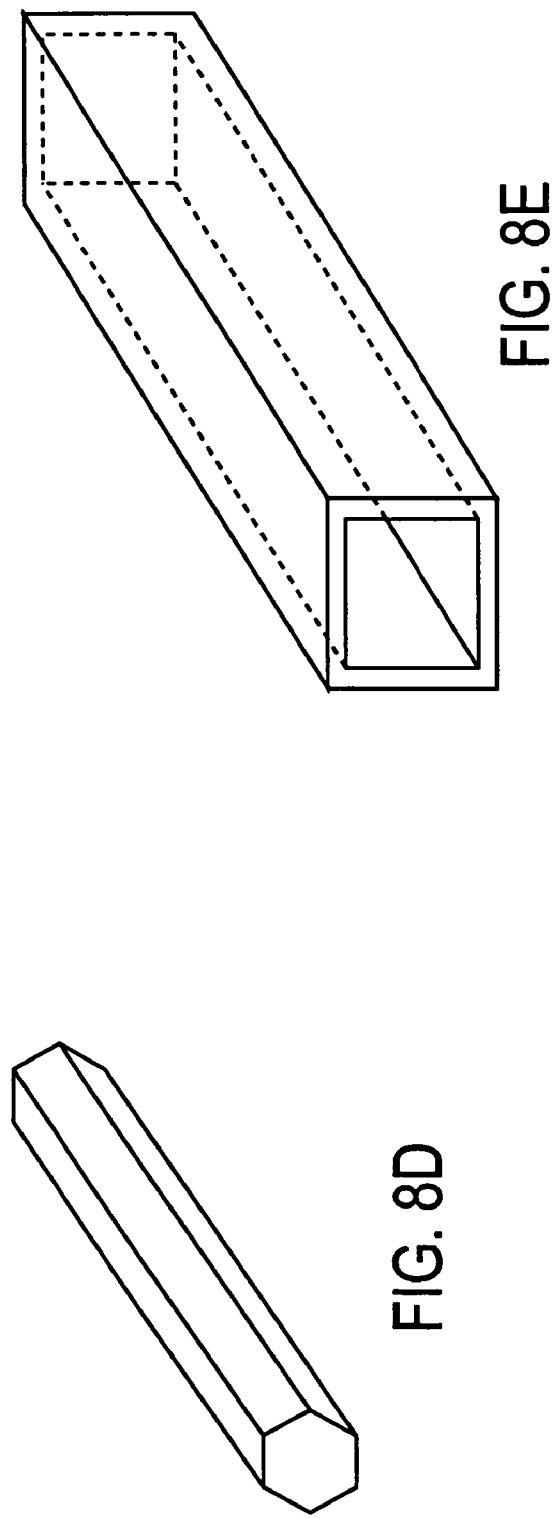

POLARIZATION RECOVERY SYSTEM USING REDIRECTION

CROSS-REFERENCE TO RELATED APPLICATIONS

This application claims priority to Provisional Application Ser. Nos. 60/448,471, filed Feb. 21, 2003, and 60/469,393, filed May 12, 2003, the disclosures of which are incorporated by reference. This application is a continuation-in-part of application Ser. No. 10/347,522, filed Jan. 21, 2003, which is a continuation of application Ser. No. 09/814,970, filed Mar. 23, 2001, now U.S. Pat. No. 6,587,269.

BACKGROUND OF THE INVENTION

1. Field of Invention

This invention relates to the recovery of light that might otherwise be unused in projection systems.

2. Description of the Related Art

Projection displays work by projecting light onto a screen. The light is arranged in patterns of colors or brightness and darkness or both. The patterns are viewed by a viewer who assimilates them by associating the patterns with images with which the viewer may already be familiar, such as characters or faces. The patterns may be formed in various ways. One way to form patterns is by modulating a beam of light with a stream of information.

Polarized light may be modulated by filtering it with polarized filters. Polarized filters will pass light, in general, if their polarization matches the polarization of the incident light. A liquid crystal display (LCD) imager may be used to perform the modulation in LCD-type projection displays. The LCD imager may include pixels that may be modulated by altering their polarization to either match or differ from the polarization of incident light. The light input to the LCD imager is polarized such that when the LCD pixels are modulated the polarization of the selected pixels is changed, and when the light output from the imager is analyzed by another polarizer, the selected pixels will be darkened. The pattern may be projected onto a screen as the presence or absence of light. If the polarization of the pixels is modulated with information in a pattern with which a viewer is familiar, the viewer may recognize the pattern projected onto the screen.

One way to polarize light for an LCD imager is with a polarizing beam splitter (PBS). Polarized light may be provided to an imaging system with an array of lenses, such as a fly's eye lens, and an array of polarizing beam splitters. A parabolic reflector may be used with a fly's-eye lens to focus light such that the light is nearly parallel. The beam is split into many sections by the lens array and each section is refocused by another lens array into the polarizing beam splitter array. A parabolic reflector, however, may reduce the brightness of a source of light, such as an arc. Furthermore, the efficiency of a fly's-eye lens recovery system depends critically on the alignment of the two lens arrays and the polarizing beam splitter array. Finally, a polarization recovery system comprised of a parabolic reflector and a fly's-eye lens may not be suited for sequential color single imager systems.

Elliptical reflectors may be used with a light pipe and a color wheel to produce sequential colors as well. Such a system, however, still requires a polarization recovery system and does not solve the intrinsic loss of brightness associated with ellipsoidal reflectors. The light output from the polarizing beam splitter array will then be linearly polarized and focused into the target. Each polarizing beam splitter divides unpolarized light into beams having disparate polarizations. Only one of the beams will be of the correct polarization to input to the LCD imager after the light is polarized. The other beam will be of an incorrect polarization and hence unusable directly.

Polarization recovery systems may be used to recover light of the unused polarization by converting it into usable light with the correct polarization. Various schemes have been developed to convert the incorrectly polarized light to the correct polarization so that it too may be used. One method, shown in FIG. 1, is to transmit light of a first polarization 102 from a polarizing beam splitter 104 directly to an output 106 while reflecting light of a second polarization 108 at an angle to the output 106, such as a 90° angle. The light of the second polarization 108 is then reflected so it is parallel the light of the first polarization 102, heading toward the output 106. A retarder plate 110, e.g. a quarter wave or half wave plate, is placed in the path of the light of the second polarization 108 to rotate it into light of the first polarization 102 such the output consists of light of only the first polarization 102.

Retarder plates rotate light from one polarization to another by slowing light in one plane down while allowing light in the opposite plane to pass relatively unimpeded. The speed at which light propagates through a medium is, in general, related to its wavelength. The degree to which light is slowed down will thus also be related to its wavelength. Since retarder plates that are applied to broadband light must pass light of a range of wavelengths, some light will be retarded more than other light. Retarder plates are, in general, tuned to a particular wavelength. In particular, wavelengths that are longer or shorter than the tuned wavelength will not be completely rotated from the unusable polarization to the correct polarization. Thus some of the light of wavelengths longer or shorter than the tuned wavelength will be lost, or at least not recovered. Retarder plates, furthermore, are relatively expensive and often not reliable. A retarder plate makes a polarization recovery system itself expensive and unreliable.

Although these systems have been used commercially, the cost of the components is high and they require critical alignments and optical designs. As a result, there is a need for a system to perform polarization conversion with high efficiency, simple configurations and lower costs.

SUMMARY OF THE INVENTION

In a first aspect of the invention a polarization recovery system may include a polarizing beam splitter transmitting a light of a useful polarization in an output direction and reflecting a light of a non-useful polarization in a first orthogonal direction substantially orthogonal to the output direction, an initial reflector disposed reflectably to the first orthogonal direction, the initial reflector reflecting the non-useful polarization light in a second orthogonal direction substantially orthogonal to the output direction and the first orthogonal direction, and a final reflector disposed reflectably to the second orthogonal direction, the final reflector reflecting the non-useful polarization light in the output direction, wherein the non-useful polarization light is rotated substantially to light of the useful polarization by the initial and final reflectors.

In a second aspect of the invention a method of polarization recovery may include polarizing substantially light into light of a useful polarization and light of a non-useful polarization, transmitting the useful polarization light in an output direction, reflecting the non-useful polarization light in a first orthogonal direction substantially orthogonal to the output direction, reflecting the non-useful polarization light in a second orthogonal direction substantially orthogonal to the output direction and the first orthogonal direction, and reflecting the non-useful polarization light in the output direction.

In a third aspect of the invention a system of polarization recovery may include means for polarizing substantially light into light of a useful polarization and light of a non-useful polarization, means for transmitting the useful light in an output direction, means for reflecting the non-useful light in a first orthogonal direction substantially orthogonal to the output direction, means for reflecting the non-useful light in a second orthogonal direction substantially orthogonal to the output direction and the first orthogonal direction, and means for reflecting the non-useful light in the output direction.

BRIEF DESCRIPTION OF THE SEVERAL VIEWS OF THE DRAWINGS

FIG. 8A–8E show various configurations of light pipes for use with an embodiment of the invention;

DETAILED DESCRIPTION OF THE PREFERRED EMBODIMENTS

It would be desirable if light of an unusable polarization could be recovered and used by converting its polarization to a correct, or useful, polarization. Since a retarder plate makes a polarization recovery system more expensive and less reliable, it would be desirable for polarization recovery to be performed without resorting to the use of retarder plates. It would be desirable for polarization recovery to be performed on broadband radiation. It would be desirable for a polarization recovery system to be relatively simple to manufacture and assemble. It would be desirable for a polarization recovery system to allow the use of a color wheel in a single imager system.

Figure 1:
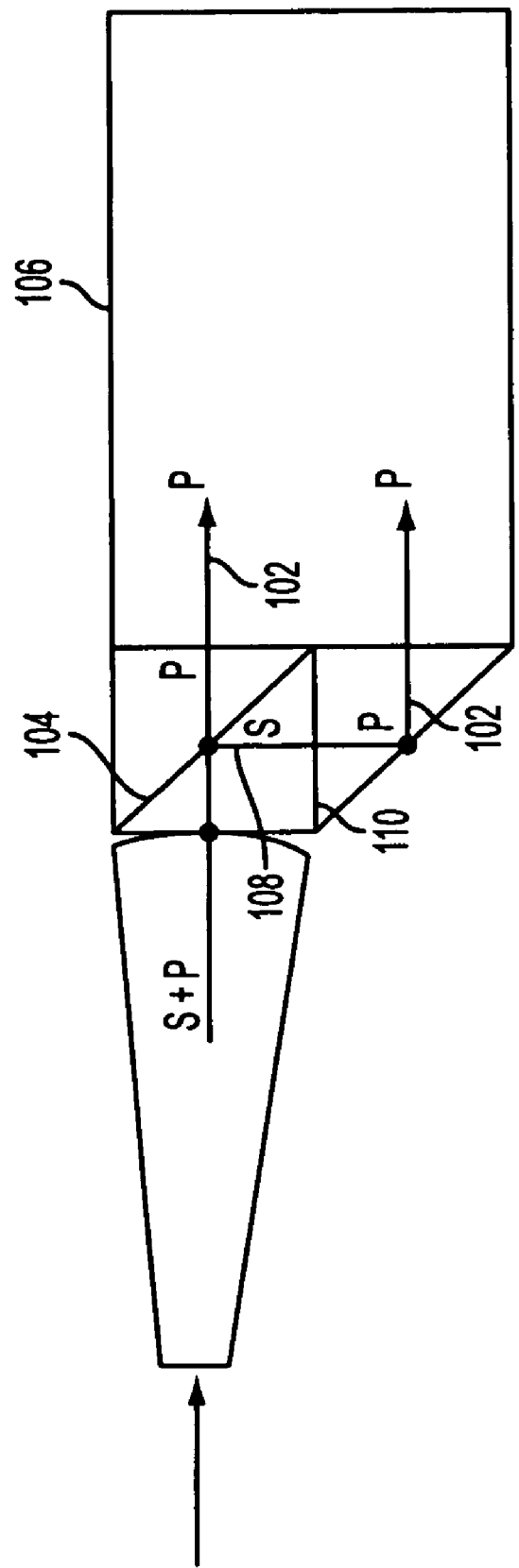
FIG. 1 shows a polarization recovery system.
Figure 2:
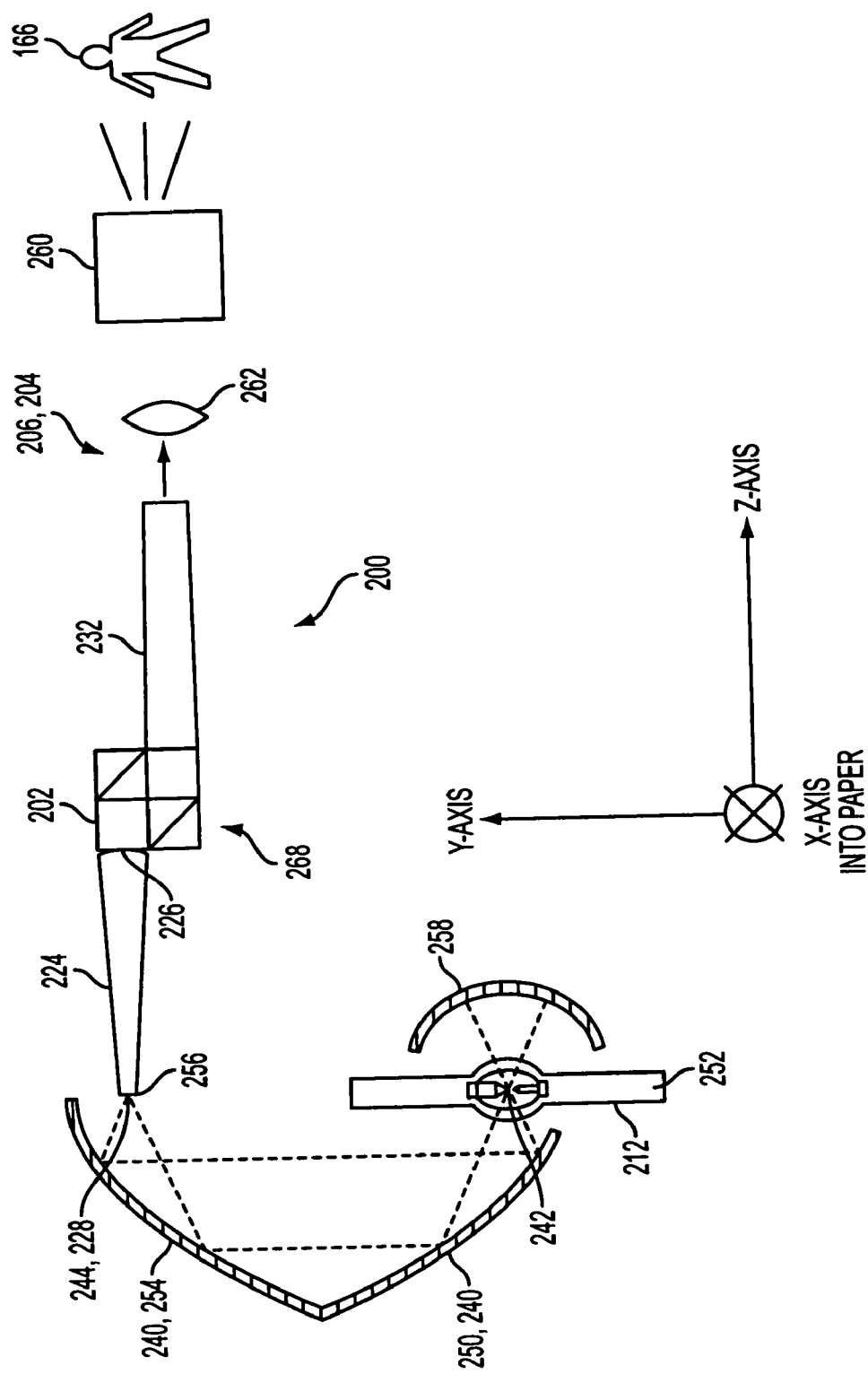
FIG. 2 shows a schematic diagram of a polarization recovery system according to an embodiment of the invention.

In FIG. 2 is shown a polarization recovery system 200 according to a first embodiment of the invention. Polarization recovery system 200 may include a polarizing beam splitter 202, such as a multi-layer coated or a wire-grid polarizing beam splitter. In one embodiment, light input to polarizing beam splitter 202 may come directly or indirectly from a source 212 of electromagnetic radiation, i.e. light. In one embodiment, source 212 of electromagnetic radiation may be an arc lamp, such as a xenon lamp, a metal halide lamp, a high intensity discharge (HID) lamp, or a mercury lamp. In another embodiment, source 212 may be a halogen lamp or a filament lamp.

Figure 5:
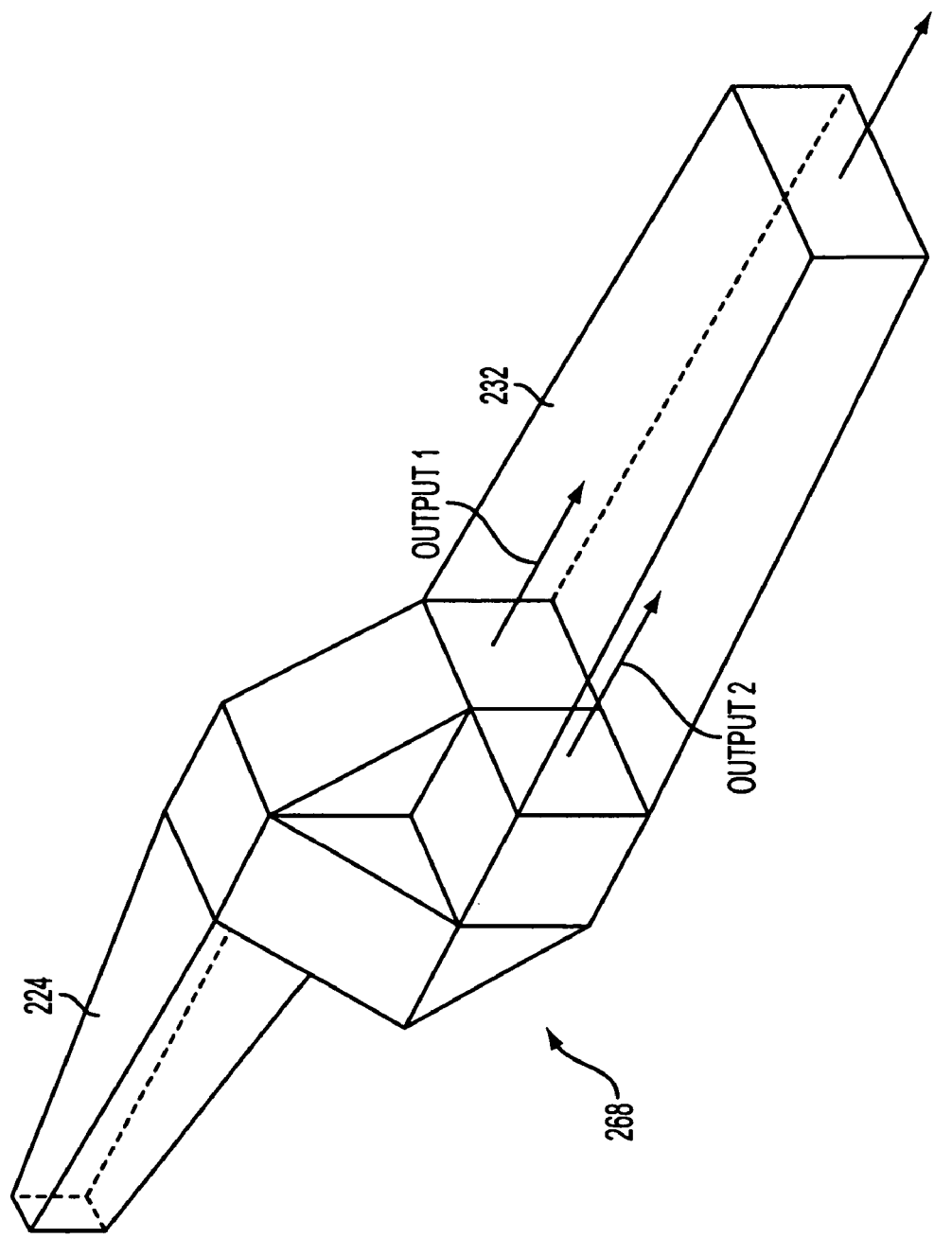
FIG. 5 shows a polarization recovery apparatus for use with an embodiment of the invention.

In one embodiment, polarization recovery system 200 may include an input light pipe 224, a supercube 268, and an output light pipe 232, as shown in FIGS. 2 and 5. In several embodiments, output light pipe 232 may be an homogenizer or an integrator. The output of input light pipe 224 may be coupled into the prism arrangement, i.e. supercube 268. Input light pipe 224 may use total internal reflection (TIR) to propagate light to supercube 268.

Figure 6A:
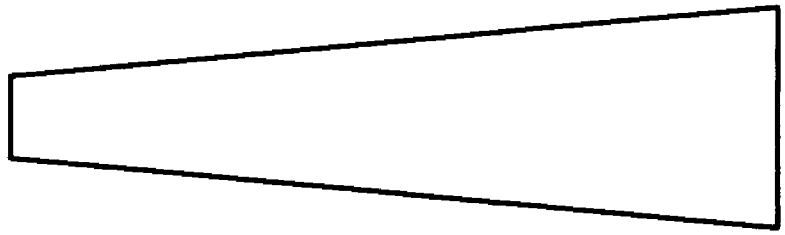
FIG. 6A–6C show straight and tapered light pipes for use with an embodiment of the invention.
Figure 6B:
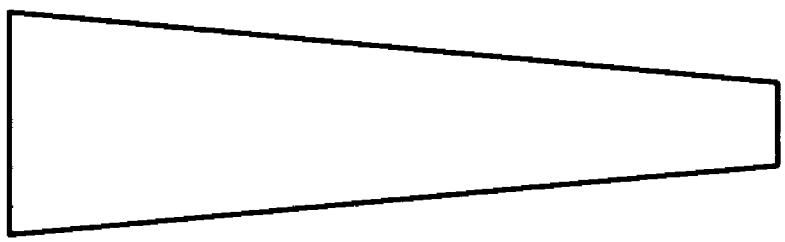
Figure 6C:
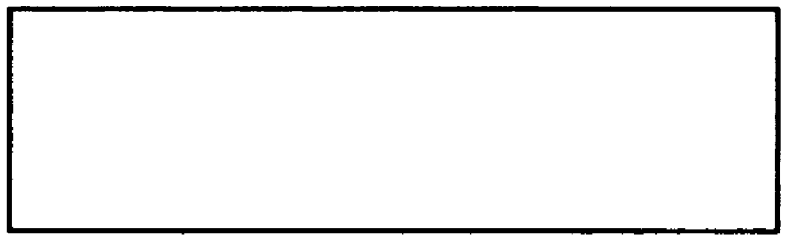
Figure 7A:
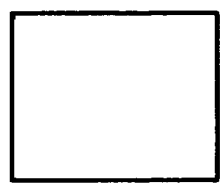
FIG. 7A–7H show various cross-sections of light pipes for use with an embodiment of the invention.
Figure 7B:
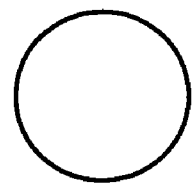
Figure 7C:
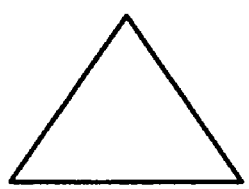
Figure 7D:
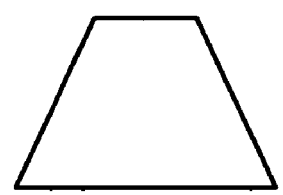
Figure 7E:
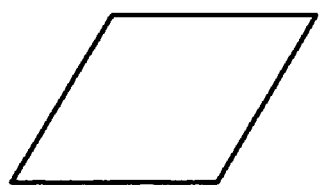
Figure 7F:
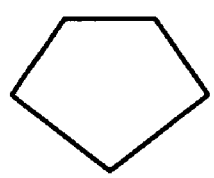
Figure 7G:
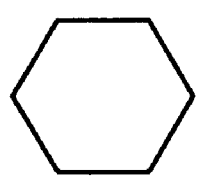
Figure 7H:
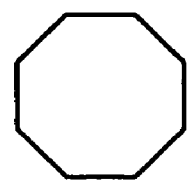

In several embodiments, input light pipe 224, output light pipe 232, or both input light and output light pipes 224 and 232 may be increasing taper light pipes, as shown in FIG. 6A, decreasing taper light pipes, as shown in FIG. 6B, or straight light pipes, as shown in FIG. 6C. In several embodiments, a cross-section of input light pipe 224, output light pipe 232, or both input light and output light pipes 224 and 232 may be rectangular, circular, triangular, rhomboid, trapezoidal, pentagonal, hexagonal, or octagonal, as shown in FIGS. 7A–7H. In several embodiments, input light pipe 224, output light pipe 232, or both input light and output light pipes 224 and 232 may be comprised of an optical fiber, an optical fiber bundle, a fused fiber bundle, a polygonal waveguide, or a hollow light pipe, as shown in FIGS. 8A–8E.

Figure 3A:
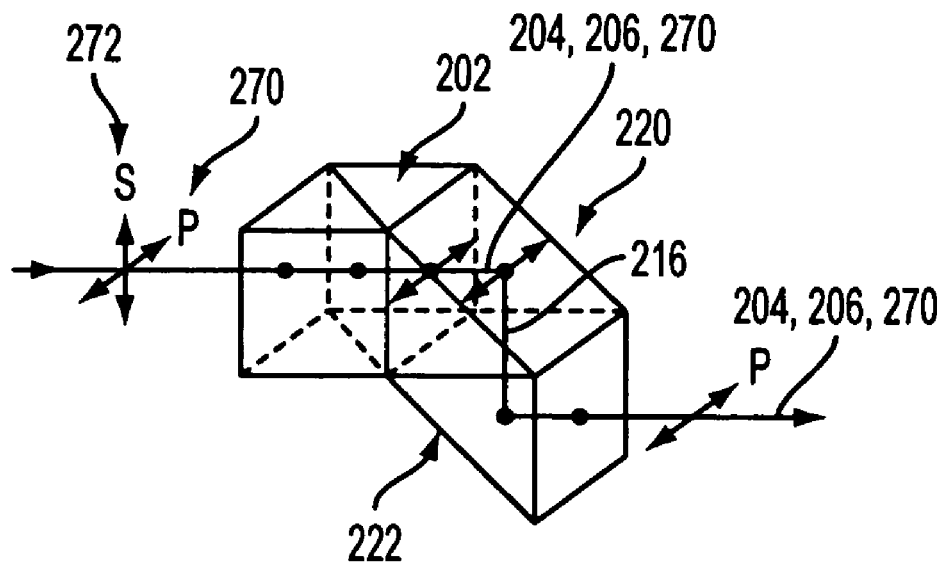
FIGS. 3A and 3B show a polarization recovery apparatus for use with an embodiment of the invention.
Figure 3B:
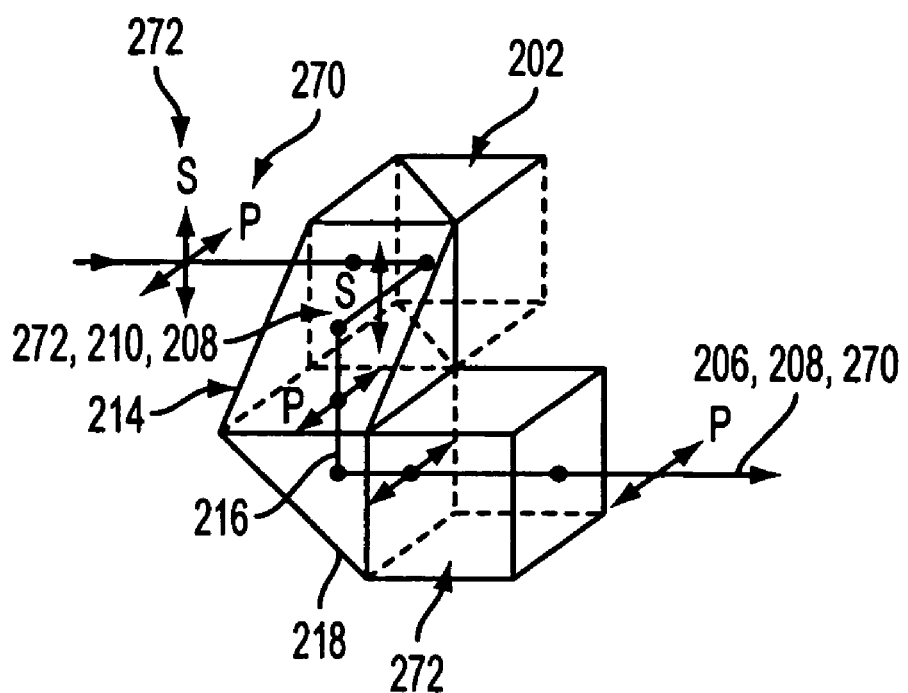
Figure 4A:
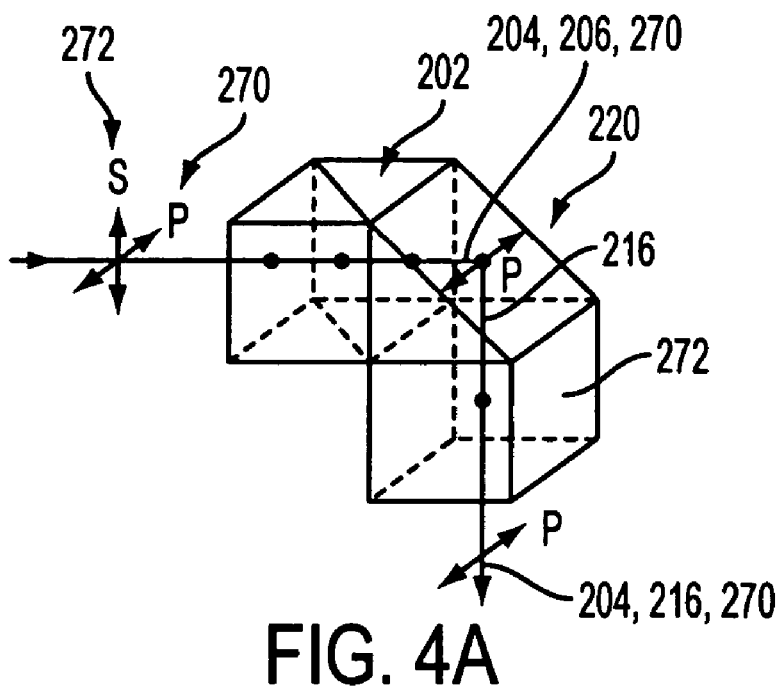
FIGS. 4A and 4B show a polarization recovery apparatus for use with an embodiment of the invention.
Figure 4B:
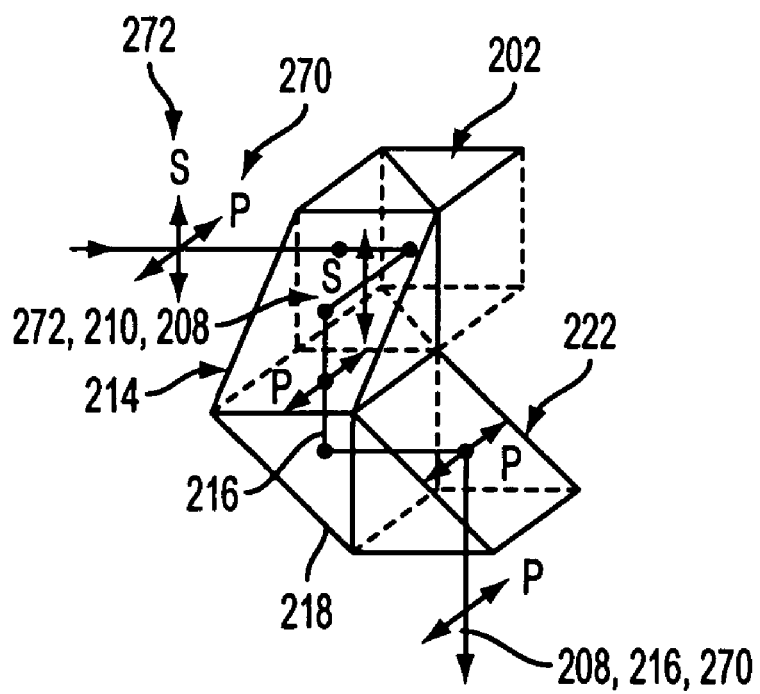

Several embodiments of polarization recovery system 200 are shown in FIGS. 3 and 4. Polarizing beam splitter 202 may separate unpolarized light from input light pipe 224 into light of a useful polarization 204 having a polarization 270, as shown in FIGS. 3A and 4A, and light of non-useful polarization 208 having a polarization 272, as shown in FIGS. 3B and 4B. Polarizing beam splitter 202 may transmit light of useful polarization 204 in an output direction 206 and reflect light of non-useful polarization 208 in a first orthogonal direction 210 substantially orthogonal to output direction 206. In one embodiment, polarization 270 may be substantially p-polarized, or horizontally polarized, light, while polarization 272 is substantially s-polarized, or vertically polarized, light. In an alternative embodiment, the planes of polarization may be reversed.

Light of useful polarization 204 may propagate through polarizing beam splitter 202 and be redirected by first output reflector 220 and second output reflector 222, exiting second output reflector 222 with polarization 270 unchanged, as shown in FIGS. 3A and 4A. Light of non-useful polarization 208, on the other hand, may be reflected by an initial reflector 214 after exiting polarizing beam splitter 202, as shown in FIGS. 3B and 4B. Initial reflector 214 may reflect light of non-useful polarization 208 about an axis substantially orthogonal to the plane of polarization 272 of light of non-useful polarization 208, which is in this case the s or vertical plane. Final reflector 218 may then reflect light of non-useful polarization 208 in a direction parallel to output direction 206. An inclined surface of initial reflector 214 may thus be rotated 90° with respect to final reflector 218. Although light of non-useful polarization 208 is still labeled light of non-useful polarization 208 for tracking purposes, it has become light of useful polarization, since the plane of polarization of light of non-useful polarization 208 is now horizontal, or p-polarized, to substantially match that of light of useful polarization 204. In one embodiment, both light of useful polarization 204 and light of non-useful polarization 208 may be coupled to output light pipe 232 and homogenized.

In one embodiment, a first output reflector 220 may be disposed reflectably to output direction 206. First output reflector 220 may reflect useful polarization light 204 in second orthogonal direction 216. In several embodiments, first output reflector 220 may be a mismatched impedance such as a prism, a right angle prism, or a mirror. In one embodiment, first output reflector 220 may have a coating that transmits a pre-determined portion of electromagnetic radiation spectrum. This might be used to discard unusable non-visible light before it is coupled into an imager. In several embodiments, pre-determined portion of electro-magnetic radiation spectrum may be infrared light, visible light, a pre-determined band of wavelengths of light, a specific color of light, or a combination thereof. In an alternative embodiment, the coating may reflect infrared light, visible light, a pre-determined band of wavelengths of light, a specific color of light, or some combination thereof.

In one embodiment, shown in FIG. 3A, a second output reflector 222 may be disposed reflectably to second orthogonal direction 216. Second output reflector 222 may reflect useful polarization light 204 in output direction 206. In another embodiment, shown in FIG. 4B, second output reflector 222 may be disposed reflectably to output direction 206. Second output reflector 222 may reflect non-useful polarization light 208 in second orthogonal direction 216. In several embodiments, second output reflector 222 may be a mismatched impedance such as a prism, a right angle prism, or a mirror. In one embodiment, second output reflector 222 may have a coating that transmits a pre-determined portion of electro-magnetic radiation spectrum. This might be used to discard unusable non-visible light before it is coupled into an imager. In several embodiments, pre-determined portion of electro-magnetic radiation spectrum may be infrared light, visible light, a pre-determined band of wavelengths of light, a specific color of light, or a combination thereof. In an alternative embodiment, the coating may reflect infrared light, visible light, a pre-determined band of wavelengths of light, a specific color of light, or some combination thereof.

In one embodiment, initial reflector 214 may be disposed reflectably to first orthogonal direction 210. Initial reflector 214 may reflect non-useful polarization light 208 in a second orthogonal direction 216 substantially orthogonal to output direction 206 and first orthogonal direction 210. In several embodiments, initial reflector 214 may be a mismatched impedance such as a prism, a right angle prism, or a mirror. A mismatched impedance may reflect a wave, such as an electro-magnetic wave, in the manner of an echo. A mismatched impedance, for example, may reflect part of a wave, or a range of wavelengths, while passing other parts of the wave, or other wavelengths.

In one embodiment, initial reflector 214 may have a coating that transmits a pre-determined portion of electro-magnetic radiation spectrum. This might be used to discard unusable non-visible light before it is coupled into an imager. In several embodiments, pre-determined portion of electromagnetic radiation spectrum may be infrared light, visible light, a pre-determined band of wavelengths of light, a specific color of light, or a combination thereof. In an alternative embodiment, the coating may reflect infrared light, visible light, a pre-determined band of wavelengths of light, a specific color of light, or some combination thereof.

In one embodiment, final reflector 218 may be disposed reflectably to second orthogonal direction 216. Final reflector 218 may reflect non-useful polarization light 208 in output direction 206. In several embodiments, final reflector 218 may be a mismatched impedance such as a prism, a right angle prism, or a mirror. In one embodiment, final reflector 218 may have a coating that transmits a pre-determined portion of electro-magnetic radiation spectrum. This might be used to discard unusable non-visible light before it is coupled into an imager. In several embodiments, pre-determined portion of electromagnetic radiation spectrum may be infrared light, visible light, a pre-determined band of wavelengths of light, a specific color of light, or a combination thereof. In an alternative embodiment, the coating may reflect infrared light, visible light, a pre-determined band of wavelengths of light, a specific color of light, or some combination thereof.

In one embodiment, polarization 272 of non-useful polarization light 208 may be rotated substantially to match polarization 270 of light of useful polarization 204 by initial and final reflectors 214 and 218. In this embodiment, first orthogonal direction 206 and second orthogonal direction 216 may lie substantially in a plane of polarization 272 of light of non-useful polarization 208. This basic block may be used to reflect and redirect light of non-useful polarization 208 from polarizing beam splitter 202 as described above such that polarization 272 of light of non-useful polarization 208 is converted to polarization 270 of light of useful polarization 204 and redirected to output direction 206.

Figure 9:
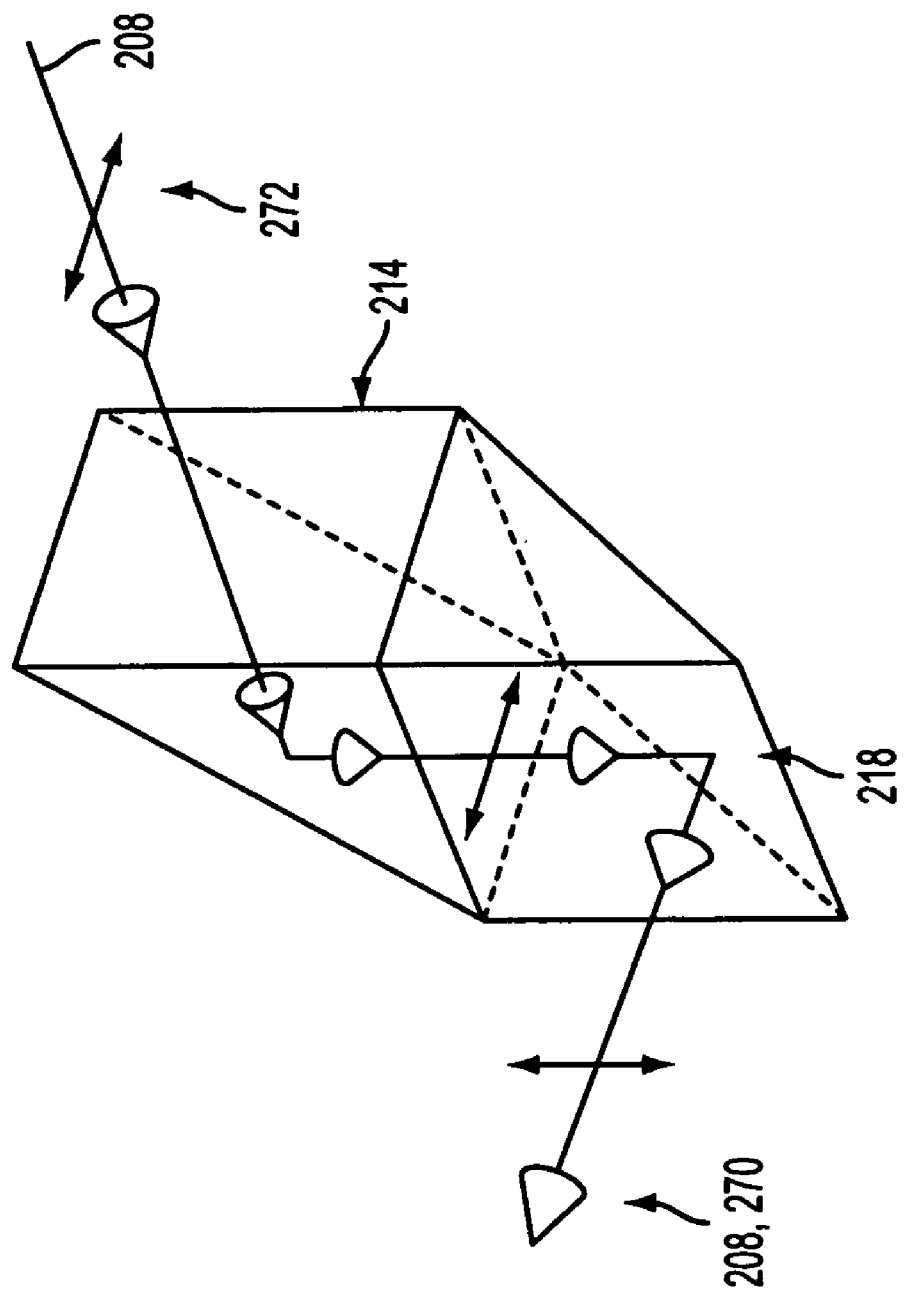
FIG. 9 shows a polarization recovery apparatus for use with an embodiment of the invention.

In an alternative embodiment, shown in FIG. 9, initial reflector 214 may reflect light of non-useful polarization 208 about an axis in the plane of polarization 272 while final reflector 218 reflects light of non-useful polarization 208 about an axis substantially orthogonal to plane of polarization 272, thereby also causing light of non-useful polarization 208 to assume polarization 270. The light from final reflector 218 may pass through a spacer 246 so that now-horizontally polarized light of non-useful polarization 208 may exit at the same plane as light of useful polarization 204. The two outputs may be coupled into output light pipe 232 to be homogenized and to have their shape and NA converted to the shape and numerical aperture desired at the output face. In one embodiment, output light pipe 232 may also use total internal reflection to propagate light to its output.

In one embodiment, light of useful polarization 204 may exit polarizing beam splitter 202 in a different direction than that of light of non-useful polarization 208 after it has been redirected to output direction 206 by final reflector 218. In one embodiment, shown in FIG. 3A, first output reflector 220 and second output reflector 222 may be used to redirect light of useful polarization 204 in the same direction as light of non-useful polarization 208. In an alternative embodiment, first output reflector 220, shown in FIG. 4A, redirects light of useful polarization 204 while second output reflector 222, shown in FIG. 4B, redirects light of non-useful polarization 208 in the same direction as light of useful polarization 204. A spacer 246 may be used in either case to allow light of useful polarization 204 to exit at the same surface as light of non-useful polarization 208. This may be useful in order to couple light of useful polarization 204 and light of non-useful polarization 208 into output light pipe 232.

In one embodiment, supercube 268 may consist of polarizing beam splitter 202 and reflectors 214, 218, 220 and 222. Light may be propagated through these optical components via total internal reflection. The surfaces of the optical components may be optically polished to promote total internal reflection. In one embodiment the optical material used for reflectors 214, 218, 220 and 222 may have a high index of refraction to promote total internal reflection of skew rays. In one embodiment, the input and output faces of the optical components may be coated with an anti-reflective (AR) coating to minimize Fresnel reflection losses.

In one embodiment, reflectors 214, 218, 220 and 222 may be produced from an optical glass such as SF11 (n=1.785).

In another embodiment, reflectors 214, 218, 220 and 222 may be produced from an optical glass such as BK7 (n=1.517). In this embodiment, however, the rays may start to leak out from the walls, particularly on the diagonal walls of reflectors 214, 218, 220 and 222.

In one embodiment, a spacer 246 may be used in conjunction with reflectors 214, 218, 220 and 222 to form a large cubic shape for ease of packaging. In one embodiment, spacer 246 may be a cube. In one embodiment, each of reflectors 214, 218, 220 and 222 may be combined with a complementary spacer 246, such as a right angle spacer, to form a little cube. In one embodiment, eight little cubes may form a supercube 268. In one embodiment, reflectors 214, 218, 220 and 222 and spacers 272 are stacked together to form supercube 268. In one embodiment, the components may be glued together by an adhesive material. In another embodiment, the components may be held together by means of a mechanical holder. This construction may be rugged and may have minimal loss.

In several embodiments, gaps may be introduced between any two of input and output light pipes 224 and 232, reflectors 214, 218, 220 and 222, or polarizing beam splitter 202 to promote total internal reflection and to reduce losses. In one embodiment, input light pipe 224, reflectors 214, 218, 220 and 222, and output light pipe 232 may be separated by small air gaps.

In one embodiment, shown in FIG. 5, supercube 268 may be made up of individual components. In one embodiment, some of the components may be combined into single unit. In one embodiment, for example, two prisms may be combined into a single prism. In this embodiment, a pair of reflectors 214, 218, 220 or 222 may be combined during the manufacturing process, such as during a glass molding process. In an alternative embodiment, two prisms may be glued together to form a single unit. In one embodiment, two prisms may be combined with half of polarizing beam splitter 202 to form a single unit. In this embodiment, the full PCS system may be made with two components together with the spacer 246. In another embodiment, a prism may be combined with a spacer 246. In one embodiment, the system may be made in two components with the separation at polarizing beam splitter 202. In this embodiment, cost may be minimized.

In one embodiment, polarizing beam splitter 202 and reflectors 214, 218, 220 and 222 may be substantially cubical. In one embodiment, polarizing beam splitter 202 and reflectors 214, 218, 220 and 222 may have all sides with the substantially similar dimensions, except for the hypotenuses of the reflectors. In this embodiment, the output of input light pipe 224 may be square, and the input of output light pipe 232 may be rectangular with an aspect ratio of 2:1. Non-cube configurations may also be implemented such that output light pipe 232 input has an aspect ratio other than 2:1, albeit with possibly larger coupling losses.

In several embodiments, input and output light pipes 224 and 232, reflectors 214, 218, 220 and 222, or polarizing beam splitter 202 may be coated with an anti-reflection (AR) coating in order to increase efficiency. In several embodiments, input and output light pipes 224 and 232 may be tapered in an increasing or decreasing manner as required by the application. Reflectors 214, 218, 220 and 222 may be reflection coated as appropriate for high angle light. Supercube 268 may be used in various configuration besides the one described.

Figure 10A:
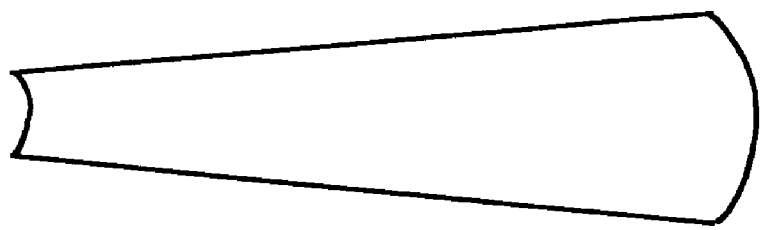
FIGS. 10A–C show various input and output surfaces of light pipes for use with an embodiment of the invention.
Figure 10B:
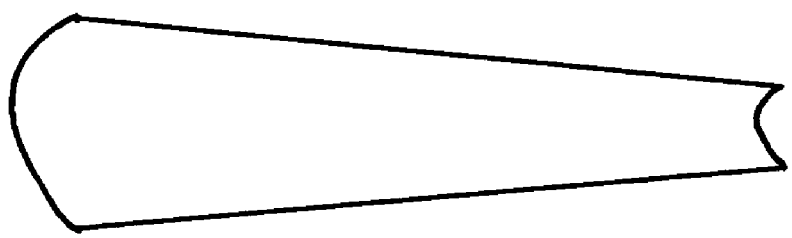
Figure 10C:

In one embodiment, an input light pipe 224 may be placed proximate to an input 226 of polarizing beam splitter 202. In one embodiment, input light pipe 224 may have an input surface 228 and an output surface 230. In several embodiments, input light pipe 224 may be made of quartz, glass, plastic, or acrylic. In several embodiments, input light pipe 224 may be a tapered light pipe (TLP) or a straight light pipe (SLP). In several embodiments, a shape of input surface 228 may be flat, convex, concave, toroidal, or spherical, as shown in FIGS. 10A–10C. A surface of input light pipe 224 may be coated such that the total internal reflection preserves the polarization. The dimensions of input surface 228 and output surface 230 may be selected such that the output numerical aperture (NA) is matched to a device receiving light from input light pipe 224.

In one embodiment, output surface 230 may be disposed proximate to input 226 of polarizing beam splitter 202. In several embodiments, a shape of output surface 230 may be flat, convex, concave, toroidal, or spherical, as shown in FIGS. 10A–10C. In one embodiment, input light pipe 224 may receive substantially un-polarized light at input surface 228 and transmit un-polarized light at output surface 230 to polarizing beam splitter 202.

In one embodiment, input light pipe 224 may be hollow. Output surface 230 may be a plano-convex lens. A convex surface of output surface 230 may be spherical or cylindrical depending on the final configuration and cost of the components. A power of output surface 230 may be designed such that the light from output surface 230 is imaged onto polarizing beam splitter 202. An inner surface of input light pipe 224 may be coated with a polarization preserving material.

In one embodiment, an output light pipe 232 may be placed proximate to an output 234 of supercube 268. In one embodiment, output light pipe 232 may have an input surface 236 that is disposed proximate to output direction 206 and an output surface 238. Output light pipe 232 may receive useful polarization light 204 and non-useful polarization light 208 at input surface 236 and may transmit useful polarization light 204 and non-useful polarization light 208 at output surface 238.

In several embodiments, a shape of input surface 236 may be flat, convex, concave, toroidal, or spherical, as shown in FIGS. 10A–10C. In several embodiments, a shape of output surface 238 may be flat, convex, concave, toroidal, or spherical, as shown in FIGS. 10A–10C. In several embodiments, output light pipe 232 may be comprised of a material selected from group consisting of quartz, glass, plastic, or acrylic. In several embodiments, output light pipe 232 may be a tapered light pipe (TLP) or a straight light pipe (SLP). A surface of output light pipe 232 may be coated such that the total internal reflection preserves the polarization. The dimensions of input surface 236 and output surface 238 may be selected such that the output numerical aperture (NA) is matched to a device receiving light from output light pipe 232.

In one embodiment, output light pipe 232 may be hollow. Output surface 238 may be convex in shape. A convex surface of output surface 238 may be spherical or cylindrical depending on the final configuration and cost of the components. A power of output surface 238 may be designed such that the light from output surface 238 is imaged onto an image projection system. An inner surface of output light pipe 232 may be coated with a polarization preserving material.

In one embodiment, a shell reflector 240 may reflect light from source 212 to polarizing beam splitter 202. In one embodiment, shell reflector 240 may have a coating that transmits a pre-determined portion of electromagnetic radiation spectrum. This might be used to discard unusable non-visible light before it is coupled into an imager. In several embodiments, pre-determined portion of electromagnetic radiation spectrum may be infrared light, visible light, a pre-determined band of wavelengths of light, a specific color of light, or a combination thereof. In an alternative embodiment, the coating may reflect infrared light, visible light, a pre-determined band of wavelengths of light, a specific color of light, or some combination thereof.

In one embodiment, shell reflector 240 may have a first and a second focal points 242 and 244. In one embodiment, source 212 of electromagnetic radiation may be disposed substantially proximate to first focal point 242 of shell reflector 240 to emit rays of light that reflect from shell reflector 240 and converge substantially at second focal point 244. In one embodiment, input surface 228 may be disposed proximate to second focal point 244 to collect and transmit substantially all of light. In another embodiment, input 226 of polarizing beam splitter 202 may be disposed proximate to second focal point 244 to collect and transmit substantially all of light. In several embodiments, shell reflector 240 may be at least a portion of a substantially elliptical surface of revolution, a substantially spherical surface of revolution, or a substantially toric surface of revolution.

In one embodiment, shell reflector 240 may include a primary reflector 250 with a first optical axis 252, and first focal point 242 may be a focal point of primary reflector 250. In this embodiment, shell reflector 240 may also include a secondary reflector 254 having a second optical axis 256 placed substantially symmetrically to primary reflector 250 such that first and second optical axes 252 and 256 are substantially collinear. In this embodiment, second focal point 244 may be a focal point of secondary reflector 254, and rays of light may reflect from primary reflector 250 toward secondary reflector 254 and converge substantially at second focal point 244. In several embodiments, primary and secondary reflectors 250 and 254 each may be a substantially elliptical surface of revolution, or a substantially parabolic surface of revolution.

In one embodiment, primary reflector 250 may be at least a portion of a substantially elliptical surface of revolution, and secondary reflector 254 may be at least a portion of a substantially hyperbolic surface of revolution. In another embodiment, primary reflector 250 may be at least a portion of a substantially hyperbolic surface of revolution, and secondary reflector 254 may be at least a portion of a substantially elliptical surface of revolution.

Source 212 may be placed at first focal point 242 of primary reflector 250 to collimate the collected light and direct it towards secondary reflector 254. The output at input surface 228 may be directed into an input light pipe 224. In one embodiment, input light pipe 224 may be a tapered light pipe (TLP). Input light pipe 224 may be useful to transform a cross-sectional area or a numerical aperture of the image of source 212. The light may be directed into a supercube polarization recovery system to obtain linearly polarized light at output light pipe 232. Linearly polarized light may be suitable for illumination of LCD-based imager chips that require polarized light.

The degree of collimation may depend on the size of source 212. Secondary reflector 254 may be positioned symmetrically with respect to primary reflector 250 such that they share common optical axes. The beam entering secondary reflector 254 converges to second focal point 244 where a target, i.e., input light pipe 224, is placed. Input light pipe 224 may couple light from second focal point 244 of secondary reflector 254. In one embodiment, source 212 may be imaged onto a target in a 1:1 ratio such that the brightness of source 212 is essentially preserved. The image of source 212 at input surface 228 may be exactly the same as source 212 with unit magnification, due to the 1:1 symmetry of the system.

Polarization recovery system 200 may be able to conserve etendue throughout the source collector components of polarization recovery system 200. The full angle of light at input surface 228 may be approximately 1800 about an axis of source 212 and 90° about an axis normal to the axis of source 212, due to the extent of the reflectors. These angles may be too large for applications such as micro displays. In one embodiment, input light pipe 224 may be a tapered light pipe (TLP) to transform a high input numerical aperture (NA) and small input area into a lower NA and larger output area without a loss of brightness, thus reducing the angles.

In one embodiment, source 212 may not be circular. In several embodiments, the input of input light pipe 224 may be designed to be of rectangular, elliptical, octagonal, or other cross-sectional shape to match the shape of the image of source 212. An input matched to the image of source 212 may prevent or reduce degradation of system etendue due to shape mismatches. The output dimensions and aspect ratios of input light pipe 224 may be designed to match a size and an aspect ratio of an imager panel, but with a super cube-based configuration they may be relatively arbitrary.

Primary and secondary reflectors 250 and 254 may cover substantially a rotational arc extent of 180° to maximize the collection efficiency, i.e., primary reflector 250 will collect approximately one half of the light emitted from source 212. A retro-reflector 258 may be placed on the opposite side of primary reflector 250 to collect the other half of the emitted light. In one embodiment, retro-reflector 258 may be a hemispherical retro-reflector. In one embodiment, a center of curvature of retro-reflector 258 may be placed near source 212 of the lamp. In this embodiment, nearly all of the light may be reflected back through source 212 to be collected by primary reflector 250 and subsequently focused into the light pipe. In practice, the efficiency of retro-reflector 258 may be reduced as much as 60% to 80% by reflectivity losses, Fresnel reflection losses, and distortion losses from the envelope of source 212.

In one embodiment, a retro-reflector 258 may be disposed on a side of source 212 opposite shell reflector 240. In one embodiment, retro-reflector 258 may be a spherical retro-reflector. In one embodiment, retro-reflector 258 may be integral to shell reflector 240. In one embodiment, retro-reflector 258 may have a coating that transmits a pre-determined portion of electromagnetic radiation spectrum. This might be used to discard unusable non-visible light before it is coupled into an imager. In several embodiments, pre-determined portion of electro-magnetic radiation spectrum may be infrared light, visible light, a pre-determined band of wavelengths of light, a specific color of light, or a combination thereof. In an alternative embodiment, the coating may reflect infrared light, visible light, a pre-determined band of wavelengths of light, a specific color of light, or some combination thereof.

In one embodiment of the invention an image projection system 260 may be disposed proximate to output direction 206 to collect substantially all of useful polarization light 204. In several embodiments, image projection system 260 may be a liquid crystal on silicon (LCOS) imager, a digital micromirror device (DMD) chip, or a transmissive liquid crystal display (LCD) panel.

In one embodiment of the invention a focusing lens 262 may be disposed proximate to output direction 206, with image projection system 260 disposed proximate to an output side 264 of focusing lens 262. An image 266 illuminated by useful polarization light 204 collected and focused at focusing lens 262 will be released by the projection system 260 to display the image 266.

In one embodiment of the invention, a method of polarization recovery may include the steps of polarizing substantially light into light of useful polarization 204 and light of non-useful polarization 208, transmitting useful polarization light 204 in an output direction 206, reflecting non-useful polarization light 208 in a first orthogonal direction 210 substantially orthogonal to output direction 206, reflecting non-useful polarization light 208 in a second orthogonal direction 216 substantially orthogonal to output direction 206 and first orthogonal direction 210, and reflecting non-useful polarization light 208 in output direction 206.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. The polarization recovery apparatus comprising:
    a polarizing beam splitter transmitting a light of a useful polarization in an output direction and reflecting a light of a non-useful polarization in a first orthogonal direction substantially orthogonal to said output direction;
    an initial reflector disposed reflectably to said orthogonal direction, said initial reflector reflecting said non-useful polarization light in a second orthogonal direction substantially orthogonal to said output direction and said first orthogonal direction;
    a final reflector disposed reflectably to said second orthogonal direction, said final reflector reflecting said non-useful polarization light in said output direction;
    a first output reflector disposed reflectably to said output direction, said first output reflector reflecting said useful polarization light in said second orthogonal direction; and
    a second output reflector disposed reflectably to said second orthogonal direction, said second output reflector reflecting said useful polarization light in said output direction; and
    wherein said non-useful polarization light is rotated substantially to light of said useful polarization by said initial and final reflectors.

2. The polarization recovery apparatus of claim 1, wherein said first output reflector is selected from the group consisting of:
    a prism,
    a right angle prism,
    a mismatched impedance, and
    a mirror.

3. The polarization recovery apparatus of claim 1, wherein said first output reflector has a coating that transmits a pre-determined portion of the electro-magnetic radiation spectrum selected from the group consisting of:
    infrared light,
    visible light,
    a pre-determined band of wavelengths of light,
    a specific color of light, and
    a combination thereof.

4. The polarization recovery apparatus of claim 1, wherein said second output reflector is selected from the group consisting of:
    a prism,
    a right angle prism,
    a mismatched impedance, and
    a mirror.

5. The polarization recovery apparatus of claim 1, wherein said second output reflector has a coating that transmits a pre-determined portion of the electro-magnetic radiation spectrum selected from the group consisting of:
    infrared light,
    visible light,
    a pre-determined band of wavelengths of light,
    a specific color of light, and
    a combination thereof.

6. The polarization recovery apparatus comprising:
    a polarizing beam splitter transmitting a light of a useful polarization in an output direction and reflecting a light of a non-useful polarization in a first orthogonal direction substantially orthogonal to said output direction;
    an initial reflector disposed reflectably to said orthogonal direction, said initial reflector reflecting said non-useful polarization light in a second orthogonal direction substantially orthogonal to said output direction and said first orthogonal direction;
    a final reflector disposed reflectably to said second orthogonal direction, said final reflector reflecting said non-useful polarization light in said output direction; and
    an output light pipe having an input surface disposed proximate to said output direction and an output surface, said output light pipe receiving said useful polarization light at said input surface and transmitting said useful polarization light at said output surface; and
    wherein said non-useful polarization light is rotated substantially to light of said useful polarization by said initial and final reflectors.

7. The polarization recovery apparatus of claim 6, wherein a shape of said input surface is selected from the group consisting of:
    flat,
    convex,
    concave,
    toroidal, and
    spherical.

8. The polarization recovery apparatus of claim 6, wherein a shape of said output surface is selected from the group consisting of:
    flat,
    convex,
    concave,
    toroidal, and
    spherical.

9. The polarization recovery apparatus of claim 6, wherein said output light pipe is comprised of a material selected from the group consisting of quartz, glass, plastic, or acrylic.

10. The polarization recovery apparatus of claim 6, wherein said output light pipe is selected from the group consisting of:
    a straight light pipe (SLP), and
    a TLP tapered light pipe (TLP).

11. The polarization recovery apparatus comprising:
    a polarizing beam splitter transmitting a light of a useful polarization in an output direction and reflecting a light of a non-useful polarization in a first orthogonal direction substantially orthogonal to said output direction;
    an initial reflector disposed reflectably to said orthogonal direction, said initial reflector reflecting said non-useful polarization light in a second orthogonal direction substantially orthogonal to said output direction and said first orthogonal direction; and a final reflector disposed reflectably to said second orthogonal direction, said final reflector reflecting said non-useful polarization light in said output direction; and wherein said non-useful polarization light is rotated substantially to light of said useful polarization by said initial and final reflectors; and wherein said initial reflector has a coating that transmits a pre-determined portion of the electro-magnetic radiation spectrum selected from the group consisting of:
  infrared light,
  visible light,
  a pre-determined band of wavelengths of light,
  a specific color of light, and
  a combination thereof.

12. The polarization recovery apparatus comprising:

a polarizing beam splitter transmitting a light of useful polarization in a output direction and reflecting a light of a non-useful polarization in a first orthogonal direction substantially orthogonal to said output direction;

an initial reflector disposed reflectably to said orthogonal direction, said initial reflector reflecting said non-useful polarization light in a second orthogonal direction substantially orthogonal to said output direction and said first orthogonal direction; and a final reflector disposed reflectably to said second orthogonal direction, said final reflector reflecting said non-useful polarization light in said output direction; and wherein said non-useful polarization light is rotated substantially to light of said useful polarization by said initial and final reflectors; and wherein said final reflector has a coating that transmits a pre-determined portion of the electro-magnetic radiation spectrum selected from the group consisting of:
  infrared light,
  visible light,
  a pre-determined band of wavelengths of light,
  a specific color of light, and
  a combination thereof.

13. The polarization recovery apparatus of claim 1, wherein said shell reflector comprises at least a portion of a shape selected from the group consisting of:
  a substantially elliptical surface of revolution,
  a substantially spherical surface of revolution, and
  a substantially toric surface of revolution.

14. The polarization recovery apparatus comprising:

a polarizing beam splitter transmitting a light of a useful polarization in an output direction and reflecting a light of a non-useful polarization in a first orthogonal direction substantially orthogonal to said output direction;

an initial reflector disposed reflectably to said orthogonal direction, said initial reflector reflecting said non-useful polarization light in a second orthogonal direction substantially orthogonal to said output direction and said first orthogonal direction;

a final reflector disposed reflectably to said second orthogonal direction, said final reflector reflecting said non-useful polarization light in said output direction;

a shell reflector having a first and a second focal points; and a source of electro-magnetic radiation disposed proximate to said first focal point of said shell reflector to emit rays of light that reflect from said shell reflector and converge substantially at said second focal point; and wherein said input surface is disposed proximate to said second focal point to collect and transmit substantially all of said light;

wherein said non-useful polarization light is rotated substantially to light of said useful polarization by said initial and final reflectors; and wherein said shell reflector comprises:
  a primary reflector having a first optical axis, and said first focal point is a focal point of said primary reflector; and
  a secondary reflector having a second optical axis placed substantially symmetrically to said primary reflector such that said first and second optical axes are substantially collinear, and wherein said second focal point is a focal point of said secondary reflector; and wherein said rays of light reflect from said primary reflector toward said secondary reflector and converge substantially at said second focal point.

15. The polarization recovery apparatus of claim 14, wherein said primary and secondary reflectors each comprise at least a portion of a shape selected from the group consisting of:
  a substantially elliptical surface of revolution, and
  a substantially parabolic surface of revolution.

16. The polarization recovery apparatus of claim 14, wherein:
  said primary reflector comprises at least a portion of a substantially elliptical surface of revolution; and
  said secondary reflector comprises at least a portion of a substantially hyperbolic surface of revolution.

17. The polarization recovery apparatus of claim 14, wherein:
  said primary reflector comprises at least a portion of a substantially hyperbolic surface of revolution; and
  said secondary reflector comprises at least a portion of a substantially elliptical surface of revolution.

18. The polarization recovery apparatus of claim 14, wherein said shell reflector has a coating that transmits a pre-determined portion of the electro-magnetic radiation spectrum selected from the group consisting of:
  infrared light,
  visible light,
  a pre-determined band of wavelengths of light,
  a specific color of light, and
  a combination thereof.

19. The polarization recovery apparatus of claim 14, further comprising a retro-reflector disposed on a side of said source opposite said shell reflector.

20. The polarization recovery apparatus of claim 19, wherein said retro-reflector comprises a spherical retro-reflector.

21. The polarization recovery apparatus of claim 19, wherein said retro-reflector has a coating that transmits a pre-determined portion of the electro-magnetic radiation spectrum selected from the group consisting of:
  infrared light,
  visible light,
  a pre-determined band of wavelengths of light,
  a specific color of light, and
  a combination thereof.

* * * * *